(12) United States Patent
Peng et al.

(10) Patent No.: US 6,843,591 B1
(45) Date of Patent: Jan. 18, 2005

(54) MULTIPLE LAMP COUPLER

(75) Inventors: Guolin Peng, Cedar Rapids, IA (US); Ronald A. Ferrante, Cedar Rapids, IA (US); Martin J. Steffensmeier, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 2 days.

(21) Appl. No.: 10/378,300

(22) Filed: Mar. 3, 2003

(51) Int. Cl.[7] .............................. F21V 7/04; G02B 27/14
(52) U.S. Cl. ...................... 362/560; 362/247; 359/618; 385/47; 385/901
(58) Field of Search ................................ 362/235–237, 362/241–247, 268, 551, 554, 560; 385/43, 47, 901; 359/618, 619, 627; 349/61, 62

(56) References Cited

U.S. PATENT DOCUMENTS

| | | | | |
|---|---|---|---|---|
| 5,031,078 A | * | 7/1991 | Bornhorst | 362/552 |
| 5,217,285 A | * | 6/1993 | Sopori | 362/1 |
| 5,997,155 A | * | 12/1999 | Ducharme et al. | 362/298 |
| 6,222,674 B1 | * | 4/2001 | Ohta | 359/618 |
| 6,318,863 B1 | * | 11/2001 | Tiao et al. | 353/31 |
| 6,341,876 B1 | * | 1/2002 | Moss et al. | 362/268 |
| 6,527,411 B1 | * | 3/2003 | Sayers | 362/245 |
| 6,547,421 B2 | * | 4/2003 | Sugano | 362/268 |

* cited by examiner

*Primary Examiner*—Alan Cariaso
(74) *Attorney, Agent, or Firm*—Nathan O. Jensen; Kyle Eppele (57) ABSTRACT

An optical coupler is designed to be utilized with multiple light sources. The optical coupler can include a reflecting mirror, a plurality of coupling rods, and an integrating rod. The reflecting mirror receives light from the light sources and reflects light to the coupling rods. The coupling rods provide a path for the light to the integrating rod.

28 Claims, 5 Drawing Sheets

MULTIPLE LAMP COUPLER

FIELD OF THE INVENTION

The present invention relates to optical couplers. More particularly, the present application relates to optical couplers for projection displays, backlit displays, fiber optic illumination devices, and other light-related applications.

BACKGROUND OF THE INVENTION

Optical applications including lighting and displays have utilized optical couplers to convey light from a lamp or other light source to an output. Heretofore, optical couplers have generally been configured to receive light from a single light source.

Providing light from a single light source reduces the available brightness and the reliability associated with the lighting system. For example, a single light source cannot provide the brightness of two, three or more light sources, and when a single light source fails, the entire lighting system fails. Further, the lifetime of the lighting system can be increased by using multiple light sources and alternately engaging one of the multiple light sources.

One particular optical application which utilizes an optical coupler is an avionic or cockpit display. Avionic displays are used to display information to one or more users and can include a translucent plate for providing fixed information or an active matrix liquid crystal display (LCD) or projection display system for providing variable information. Such displays typically utilize a single arc lamp, or other tube-bused light source that provides light through an optical coupler to an output of the display. Such displays become unreadable or difficult to read if illumination from the optical coupler ceases. In avionic applications, a light source failure can cause an entire aircraft to be unoperationable or to be delayed for repairs. Accordingly, it is desirous to design lighting systems used in avionic displays to have a long lifetime and to be reliable.

Other display applications can be utilized with liquid crystal display technology found in portable computers, laptop computers, word processors, and avionic cockpit applications. It is desirous in those applications to have a reliable, bright lighting system.

In another optical application, a projection display system such as a projection television system, an overhead projector, or other display requires a light source which can provide high brightness. In these applications, it is also desirous to have a reliable, bright lighting system.

Thus, there is a need for lighting systems which can utilize an optical coupler capable of receiving light from multiple light sources. Further, there is a need for an optical coupler that is lightweight and compact for use in display and other lighting applications. Further still, there is a need for a display or lighting system having greater reliability and brightness capabilities. Yet further, there is a method for operating a display which achieves greater lifetime. Yet further still, there is a need for a method of manufacturing a lighting system which includes multiple light sources associated with multiple light paths that are combined into an integrated light path.

SUMMARY OF THE INVENTION

An exemplary embodiment is related to an optical coupler for use in a display or lighting system including a plurality of light sources. The optical coupler includes a reflecting mirror, a plurality of coupling rods, and an integrating rod. The reflecting mirror receives light from the light sources and reflects the light to the coupling rods. The coupling rods provide a path for the light to the integrating rod.

Another exemplary embodiment relates to a cockpit display. The cockpit display includes a plurality of light sources, a reflecting member, a plurality of coupling members, and a collecting member. The light sources include at least a first light source and a second light source. The reflecting member is disposed to receive light from the first light source and the second light source. The coupling members are disposed to receive light reflected from the reflecting member. The coupling members include at least a first member and a second member. The first member is disposed to receive the light from the first light source reflected by the reflecting member. The second member is disposed to receive the light from the second light source reflected by the reflecting member. The collecting member is disposed to receive the light from the first member and the second member at a first end.

Yet another exemplary embodiment relates to a light apparatus. The light apparatus includes means for reflecting first light from a first light source and second light from a second light source and means for providing the first light along a first path and the second light along the second path. The light apparatus further includes means for receiving the first light from the first path and the second light from the second path and providing the first light and the second light at a light output.

Still another exemplary embodiment relates to a method of manufacturing a display. The method includes providing a plurality of light sources and providing a reflective mirror. The reflective mirror has respective surfaces which disposes to reflect light from reflective light sources of the light sources. The method further includes providing a plurality of respective light paths disposed to receive the light from the respective surfaces and providing an integrating member disposed to receive the light from the light paths.

Still another embodiment relates to a lighting system. The lighting system includes a first lamp, a second lamp and an optical coupler including a first rod, a second rod, and a tapered rod. The first rod receives light from the first lamp, the second rod receives light from the second lamp. The tapered rod is coupled to the first rod and the second rod at a first face. The tapered rod provides light at an output at a second face opposite the first face.

Yet still another exemplary embodiment relates to a method of operating a light system including a first light source and a second light source. The method includes providing first light from a first lamp through a coupling member to an integrating member, and providing second light from the second light source through a second coupling member to the integrating member.

BRIEF DESCRIPTION OF THE DRAWINGS

The exemplary embodiments will hereafter be described with reference to the accompanying drawings, wherein like numerals denote like elements, and.

DETAILED DESCRIPTION OF THE PREFERRED EMBODIMENTS

Figure 1:
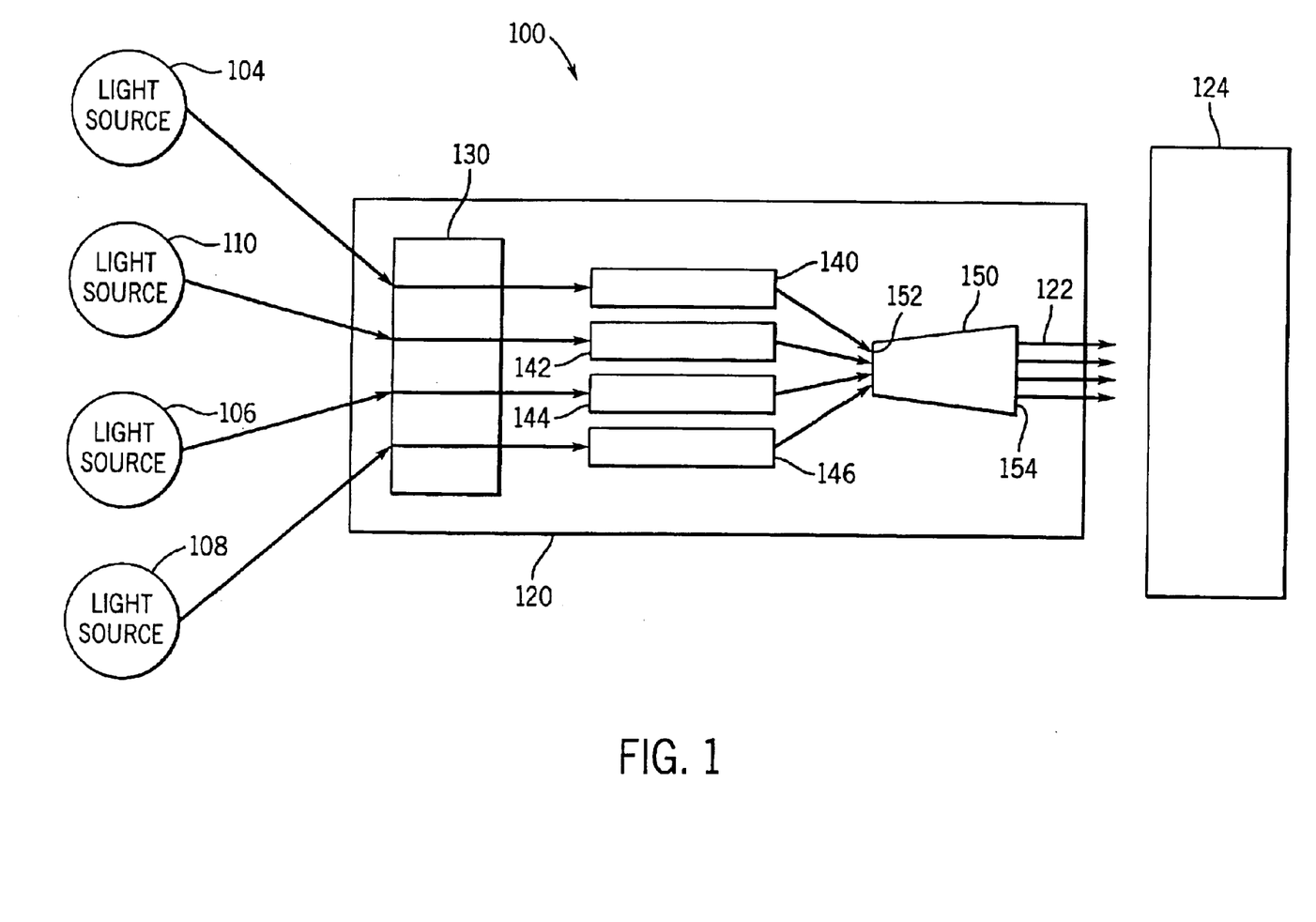
FIG. 1 is a general schematic block diagram of a lighting apparatus including an optical coupling system in accordance with an exemplary embodiment of the present invention.

With reference to FIG. 1, a light apparatus or system 100 can be utilized in any of a number of applications. According to one preferred embodiment, system 100 is at least part of an avionic display. In another preferred embodiment, system 100 can be utilized to provide light in a building or vehicle. In still another preferred embodiment, system 100 can be a light source for an overhead projector, a projection television, or other display. System 100 can be utilized in any application in which it is desirous to provide relatively uniform brightness of light and to utilize multiple light sources.

In FIG. 1, system 100 includes four light sources, a light source 104, a light source 106, a light source 108, and a light source 110. Alternatively, system 100 can include more light sources or fewer light sources. For example, system 100 can include only two light sources 104 and 110, can include three light sources 104, 106, and 110, five light sources, six light sources, etc. The number of light sources is not shown or described in a limiting fashion.

System 100 also includes an optical coupler 120. Optical coupler 120 receives light from multiple light sources, such as sources 104, 106, 108 and 110. Coupler 120 provides a path for light to travel from sources 104, 106, 108, and 110 to light output 122. Light output 122 can be provided to a room, to a display, to a lens, to a sign, a liquid crystal display (LCD), a projection display system, or any optical component. In an exemplary embodiment, the shape of the coupling rod is any type of polygon. In a preferred embodiment, the shape of the coupling rod is rectangular. The cross-sectional shape of the coupling rod may also be identical or may vary along the length of the coupling rod. For example, in a preferred embodiment, the coupling rod includes a taper, such that the cross-sectional area of the coupling rod at one end differs from that at the opposite end. In another exemplary embodiment, the cross-sectional area remains constant along the length of the coupling rod.

In FIG. 1, system 10 is shown providing light at output 122 through a system 124. In a preferred embodiment, system 124 can be a projection display for avionic application, such as those used in the cockpit of an aircraft. According to a preferred embodiment, optical coupler 120 has a relatively lightweight and compact structure to meet the strict size requirements associated with avionic displays.

Optical coupler 120 includes a mirror or reflecting member 130, a coupling member 140, a coupling member 142, a coupling member 144, a coupling member 146, and an integrating member 150. Coupling rods or members 140, 142, 144 and 146 are optically coupled to integrating rod or member 150. Member 150 acts as a collector for receiving light from the light paths associated with members 140, 142, 144, and 146. Preferably, member 150 is optimized for providing uniform brightness at output 22.

In operation, light from light sources 104, 106, 108 and 110 is received by reflective member 130 and reflected to members 140, 142, 144 and 146, respectively. The light from members 140, 142, 144 and 146 is collected in integrating member 150. In one embodiment, members 140, 142, 144 and 146 can be directly physically coupled to member 150 and member 130 is not physically attached to members 140, 142, 144, and 146. Alternatively, other coupling methods and devices intermediate members 140, 142, 146 and 148 and member 150 and intermediate member 130 and members 140, 142, 144 and 146 can be provided.

Light sources 104, 106, 108 and 110 can be any type of light sources including tube light sources. In one embodiment, sources 104, 106, 108 and 110 are arc lamp light sources. Alternatively, fluorescent light sources, light emitting diodes, LEDs, incandescent lamps, and other devices can be utilized as light sources 104, 106, 108 or 110.

Reflecting member 130 can be a reflective prism, a dielectric mirror, or a reflective polished surface. Members 140, 142, 144 and 146 can be any device for providing a light path. In one embodiment, members 140, 142, 144 and 146 are fiber optic tubes or rods.

Light from light sources 104, 106, 108 and 110 is collected from members 140, 142, 144, and 146 at a face 152 of integrating member 150. A face 154 of member 150 serves as output 122 for the light collected at face 152. Face 152 is generally closer to members 140, 142, 144 and 146 than face 154. In one embodiment, face 152 is in direct physical contact with members 140, 142, 144 and 146.

Integrating member 150 is preferably a light collecting piece or optical rod. Member 150 can be a fused silica structure or other optical material for collecting light and providing the collected light at output 122.

Figure 2:
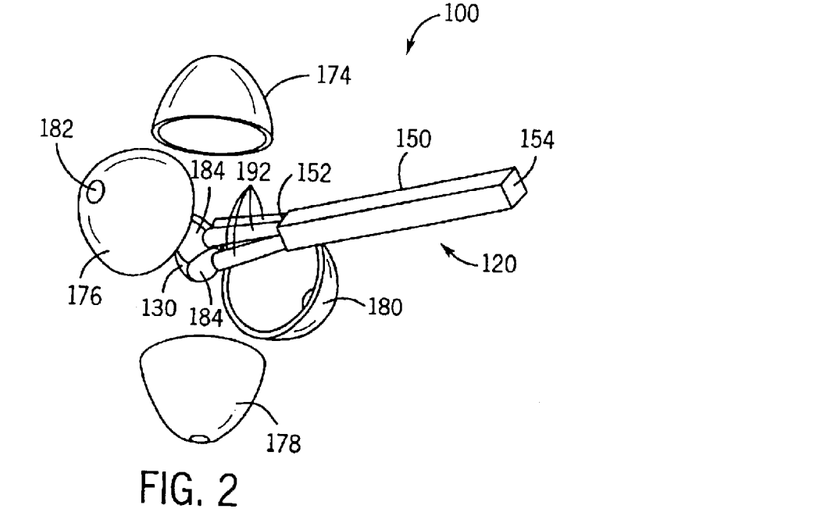
FIG. 2 is a perspective view schematic drawing of the lighting apparatus illustrated in FIG. 1 in accordance with another exemplary embodiment.

With reference to FIG. 2, a perspective view of part of system 100 includes optical coupler 120 and a set of mirror/reflectors, such as, reflective surfaces 174, 176, 178 and 180. Surfaces 174, 176, 178 and 180 can be part of light sources 104, 106, 108 and 110, respectively.

Each of surfaces 174, 176, 178 and 180 includes an aperture 182 through which light sources 104, 106, 108 and 110, respectively, can be provided. In a preferred embodiment, a separate arc lamp is provided through each of apertures 182.

Surfaces 174, 176, 178, and 180 reflect and direct (e.g., focus) the light to reflecting member 130. In particular, light from light sources 104, 106, 108 and 110 is directed to reflective member 130 and into a respective one of coupling members 140, 142, 144 and 146 (encircled by line 192 in FIG. 2). Reflective member 130 is preferably a conically shaped member having a reflective surface 184 for each of light sources 104, 106, 108 and 110.

Reflectors 174, 176, 178 and 180 can be elliptical mirrors manufactured from Pyrex9 glass overcoated with a dielectric coating. Light sources 104, 106, 108 and 110 can be a metal halide, mercury, or xenon arc lamp. Such light sources have relatively bright outputs for strong light.

Light generated by each of light sources 104, 106, 108 and 110 is reflected from a respective surface 184 reflective member 130 into a respective one of coupling members 140, 142, 144 and 146 (FIG. 1). Light in members 140, 142, 144 and 146 is received in integrating member 150 at a face 152 and is provided to a face 154 of member 150. Preferably, member 150 has relatively rectangular cross-sectional shape. Member 150 can be tapered from a square cross-section at face 152 to a rectangular cross-section at a face 154. Integrating member 150 advantageously does not produce hot spots because of its rectangular tapered shape.

Figure 3:
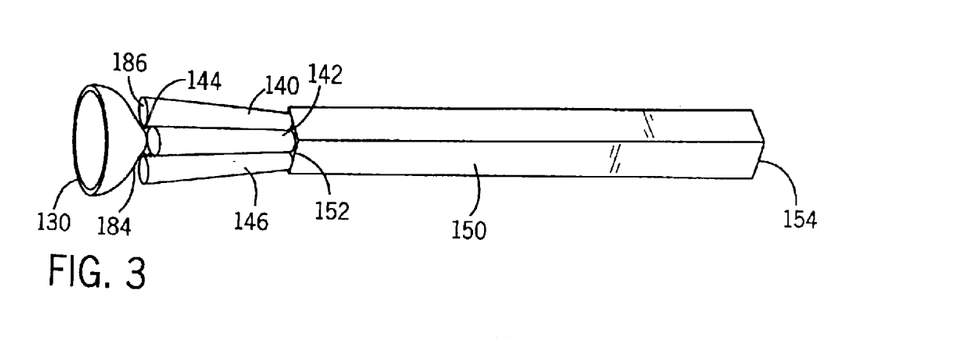
FIG. 3 is a more detailed perspective view schematic diagram of the optical coupling system illustrated in FIG. 2.

With reference to FIG. 3, reflective member 130 has reflective surface 184 which can be embodied as a flat triangular surface. As shown in FIG. 2, member 130 is conical and has four flat reflective surfaces 184. Member 130 has a top portion that resembles a pyramid shape. Each surface 184 is configured to reflect light into a face 186 of a respective member 140, 142, 144 and 146. The placement of sources 104, 106, 108, and 110 and orientation of surfaces 184 can be adjusted in a variety of ways to properly reflect light to members 140, 142, 144, and 146.

Member 130 is preferably a refractive mirror having four reflective surfaces corresponding to four arc lamps. Member 130 can have a circular base and four cut off pyramidal sides with each of the sides having a mirrored surface thereon. Reflecting surfaces 184 of member 130 can be a dichroic mirror such as a thin piece of glass or quartz coated with a series of dielectric films. Alternatively, a metal-coated glass mirror can be utilized. However, such mirrors have low reliability in heat environments.

Member 130 can also be configured to provide appropriate light filtering for system 10. For example, member 130 can include colored filters for providing appropriate visual effects or for night vision equipment.

Accordingly, each light source 104, 106, 108, and 110 has its light focused into a respective face 186 of members 140, 142, 144, and 146 by member 130. The light from all of sources 140, 142, 144, and 146 is combined in member 150. Coupling members 140, 142, 144 and 146 are necessary to provide the appropriate focal length for reflective member 130. Members 140, 142, 144 and 146 could be eliminated if an appropriate focal length could be provided and appropriate focal length could be achieved.

As shown in FIG. 3, members 140, 142 and 146 are not directly coupled to member 130. Preferably, members 140, 142, 144 and 146 are disposed at an appropriate distance associated with member 130. In one embodiment, surfaces 184 can be situated 6 millimeters from its respective face 186.

Integrating member 150 is directly physically coupled at face 152 to members 140, 142, 144 and 146. In one embodiment, optical paste can be utilized to adhere members 140, 142, 144 and 146 to member 150. Alternatively, member 150 can be spaced from members 140, 442, 144 and 146.

Figure 4:
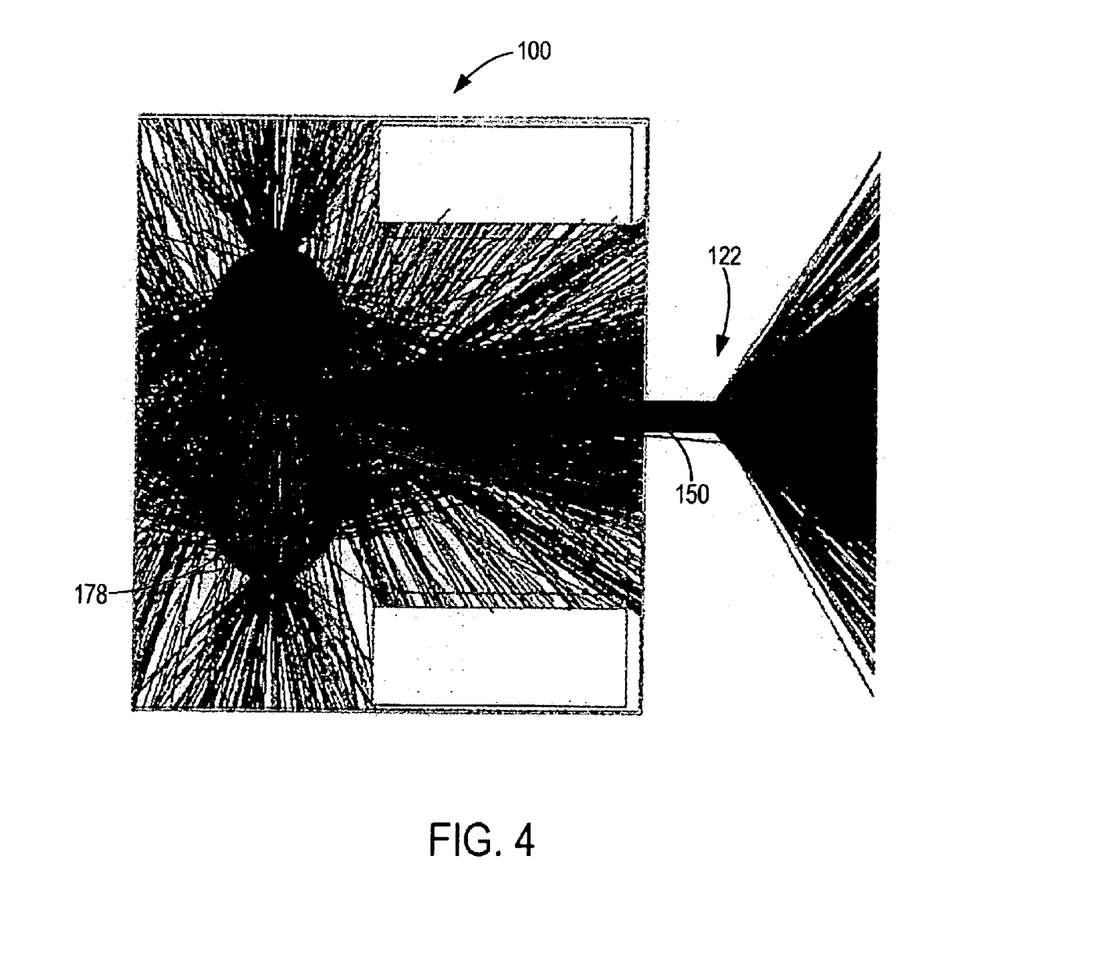
FIG. 4 is a general schematic diagram showing the operation of the lighting apparatus illustrated in FIG. 1.
Figure 5:
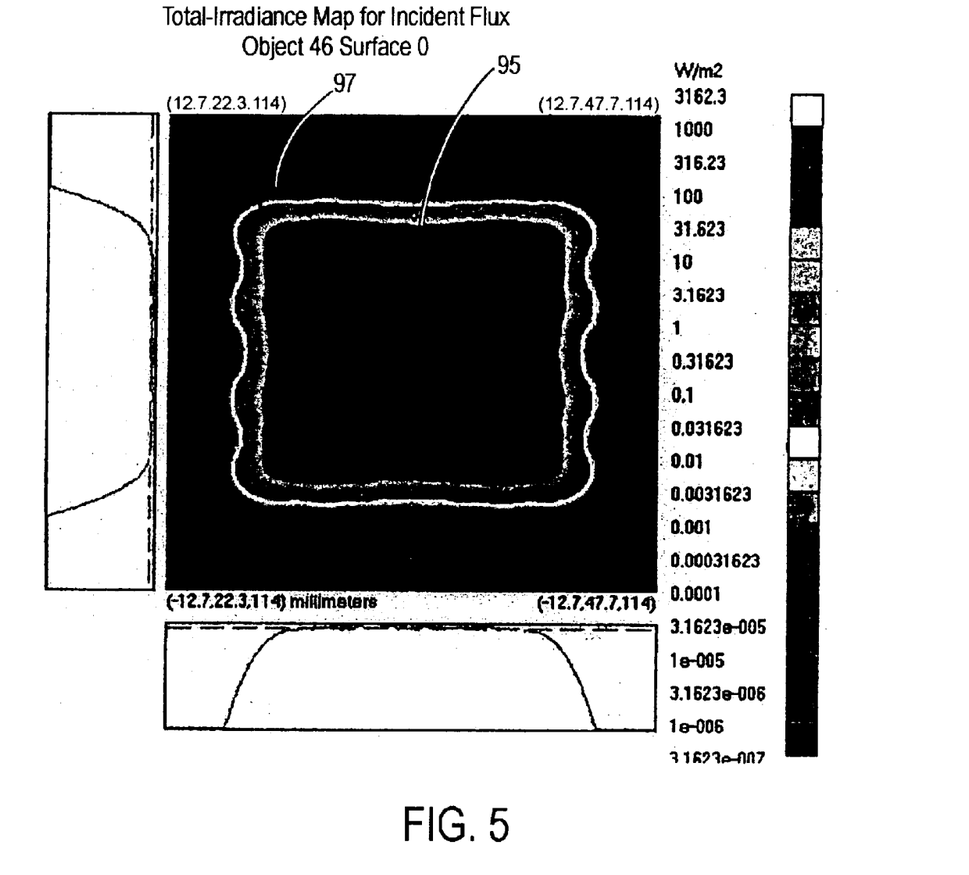
FIG. 5 is an irradiance map showing the uniform light performance of the lighting apparatus illustrated in FIG. 1.

With reference to FIG. 4, a schematic block diagram shows the operation of system 100. Light is received in coupler 120 and provided at output 122. A blue section 95 in FIG. 5 shows a relatively consistent brightness across a rectangular viewing area. Blue section 95 represents a brightness of 300–1000 watts per square meter. Brightness is reduced along edges 97 until a level of zero watts per square meter is reached. However, suitable performance is still achieved.

The superior output represented by blue section 95 is the result of the tapered shape for member 150. The square shaped cross section associated with member 150 mixes the light to provide a uniform output. The tapered characteristic reduces the angle of rays coming out of the tapered rod, thereby optically making light easier to collect.

Figure 6:
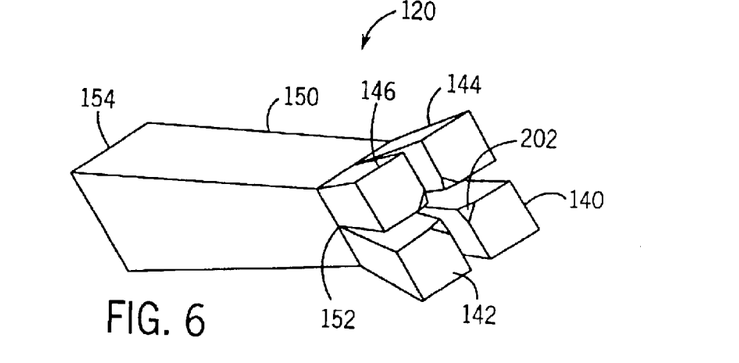
FIG. 6 is a more detailed perspective view schematic drawing of the coupling rods and integrating rod used in the optical coupling system illustrated in FIG. 2.

With reference to FIG. 6, a perspective view of members 140, 142, 144 and 146 and member 150 of coupler 120 is shown. As shown in FIG. 6, members 140, 142, 144 and 146 have a relatively rectangular cross sectional shape as opposed to the circular cross-sectional shape shown in FIG. 3. However, either shape is suitable. Alternative shapes (e.g., oval, trapezoidal, etc.) can also be utilized.

Members 140, 142, 144 and 146 each include a cutout 202. Cutout 202 performs the function of position optimization of the coupling rod and reflecting mirror. Cutout 202 is preferably located on the innermost corner of members 140, 142, 144 and 146 (e.g., the corner closes to the center of the group of members 140, 142, 144 and 146).

As shown in FIG. 6, integrated member 150 has a slightly tapered shape. Preferably, member 150 has a rectangular cross sectional area that is larger at face 154 than at face 152. Preferably, member 150 is tapered in one direction. Alternatively, member 150 can be tapered in two directions depending upon design criteria.

Figure 7:
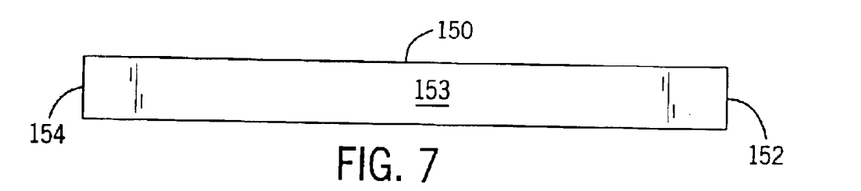
FIG. 7 is a top planar view schematic drawing of the integrating rod illustrated in FIG. 6.
Figure 8:
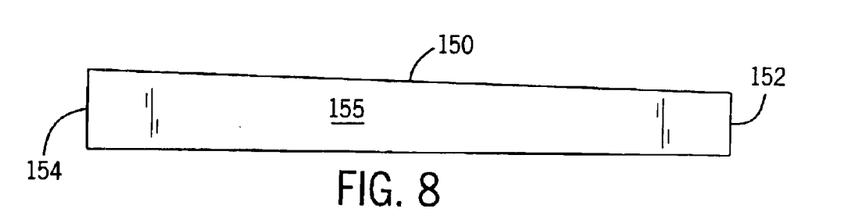
FIG. 8 is a side planar view schematic drawing of the integrating rod illustrated in FIG. 6.

With reference to FIG. 7, in a preferred embodiment, member 150 has a rectangular top surface 153. Rectangular top surface has a height of 12.8 millimeters and a length of 130 millimeters plus or minus 0.1 millimeters in the preferred embodiment. In FIG. 8, a side surface 155 of member 150 has a trapezoidal shape having a length of 130 millimeters, a height of 12.8 millimeters at an end 152, a height of 15.9 millimeters at an end 154, and a length of 130 millimeters plus or minus 0.1 millimeters. In other exemplary and alternative embodiments, the specific dimensions recited above may vary without departing from the scope of the invention as described herein.

Figure 9:
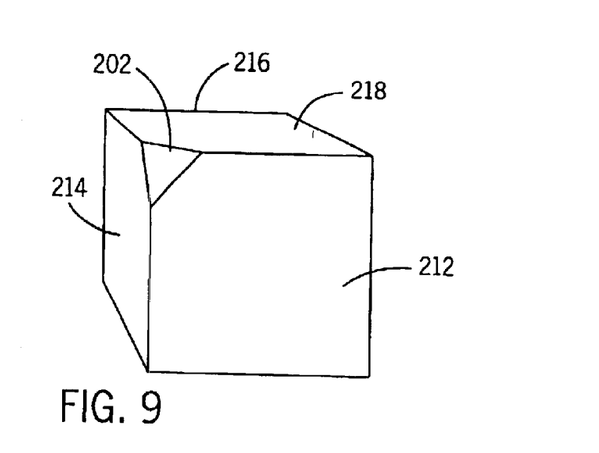
FIG. 9 is a more detailed perspective view of one of the coupling rods illustrated in FIG. 6.

FIG. 9 shows a perspective view of one of members 140, 142, 144 and 146. Cutout 202 is embodied as a surface having a shape of an isosceles triangle having sides of two millimeters.

Figure 10:
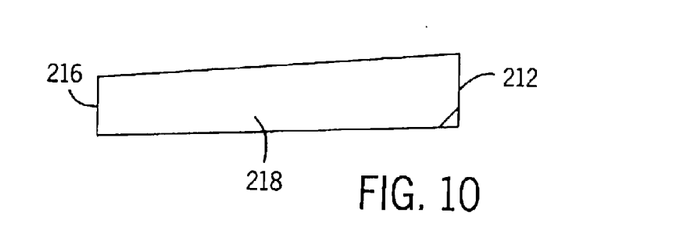
FIG. 10 is a more detailed side planar view of one of the coupling system as illustrated in FIG. 6.
Figure 11:
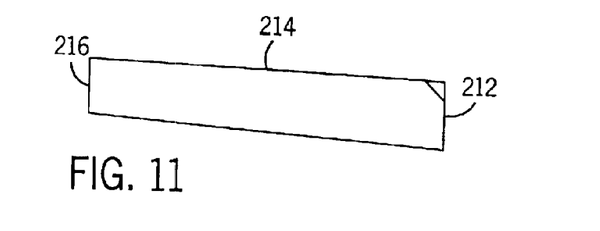
FIG. 11 is a more detailed top planar view of one of the coupling rods illustrated in FIG. 6.

FIG. 10 is a side view and FIG. 11 is a top view of one of members 140, 142, 144 and 146. An end 212, the end that is closest to reflective member 130, preferably has a square cross sectional shape of dimensions of 8 millimeters by 8 millimeters. Member 130 preferably has an end 216, the end that is closer to face 152 of member 150. End 216 can have a square cross sectional shape of dimensions of 6.2 millimeters by 6.2 millimeters.

Preferably, an angle between surface 214 and surface 216 is 88 degrees. An angle from surface 218 to surface 216 is also preferably 88 degrees.

In FIG. 10, surface 218 has a length of 40 millimeters and a heights of 6.2 millimeters and 8 millimeters. In FIG. 11, surface 214 has heights of 6.2 millimeters and 8 millimeters, and a length of 40 millimeters. Members 142, 144 and 146 can be fused silica or quartz tubes.

With reference to the dimensions specified in the description of FIGS. 7–10 above, it should be understood to those of skill in the art that the dimensions recited are exemplary only and are in no way intended to limit the scope of the present invention to the particular dimensions recited herein.

System 10 can be operated in a number of modes in order to increase lifetime and reliability. For example, only one of light sources 104, 106, 108 and 110 can be utilized and when light source 104 fails, a light source 106, 108 or 110 can be utilized. In this way, four times the lifetime can be accomplished within a single source. Circuitry can be utilized to determine when light source fails and automatically cause system 10 to utilize a different light source.

In addition, system 100 can include a selector switch for illuminating more than one of light sources 104, 106, 108 and 110 to achieve levels of brightness provided at output 122. For example, two of light sources 104, 106, 108 and 110 can be provided to provide a medium level of brightness and all four of light sources 104, 106, 108 and 110 can be used to provide a brightest level of light. In a preferred embodiment, a single light source is utilized and the use of sources 104, 106, 108 and 110 is cycled periodically to ensure the longest lifetime for system 100.

In one embodiment, system 100 can be utilized to provide light to a number of rooms or positions by providing an output 144 at a number of rooms or positions and yet having a single location for light sources 104, 106, 108 and 110. Further, output 154 can be utilized in medical applications. For example, output 154 can be utilized as a surgical headlamp, or as a light source for invasive surgical procedures or surgical microscope equipment.

Further still, outputs 154 could be provided at a number of locations in an airplane, thereby eliminating the use of wires, bulbs, electrical surfaces, and individual lights at each seat for an airplane. Output 154 could be provided above each seat and include a slideable opaque door or other means to provide dimming.

Although certain types of lighting devices and displays have been discussed, the optical coupler can be utilized in a variety of lighting applications. Further still, although particular dimensions are discussed, those dimensions are disclosed for example only, and may vary in alternative embodiments. Application parameters and design criteria can affect the chosen parameters. For example, adjustments in sizes and shapes may be required to achieve appropriate focal lengths and optical coupling.

What is claimed is:

1. An optical coupler for use in a display system including a plurality of light sources, the optical coupler comprising:
   a reflecting member;
   a plurality of coupling rods; and
   an integrating rod, wherein the reflecting member receives light from the light sources and reflects light to the coupling rods, wherein the coupling rods provide a path for the light to the integrating rod.

2. The optical coupler of claim 1, wherein the reflecting member is a conically shaped member having four reflecting surfaces, the reflecting surfaces providing the light to four respective coupling rods of the plurality of coupling rods.

3. The optical coupler of claim 1, wherein the reflecting member includes a plurality of reflecting surfaces, the reflecting surfaces providing the light to a plurality of coupling rods.

4. The optical coupler of claim 2, wherein the four reflecting surfaces form a pyramidal shape.

5. The optical coupler of claim 1, wherein the coupling rods have a circular cross section.

6. The optical coupler of claim 1, wherein the coupling rods have a cross section that is at least one of rectangular and square.

7. The optical coupler of claim 1, wherein the integrating rod is tapered, the integrating rod having a larger width at a first end farther from the coupling rods than a width at a second end closer to the coupling rods.

8. The optical coupler of claim 7, wherein the integrating rod is directly physically coupled at the second end to the coupling rods.

9. An avionic display, comprising:
   a plurality of light sources including at least a first light source and a second light source;
   a reflecting member disposed to receive light from the first light source and the second light source;
   a plurality of coupling members disposed to receive light reflected from the reflecting member, the coupling members including at least a first member and a second member, wherein the first member is disposed to receive the light from the first light source reflected by the reflecting member, wherein the second member is disposed to receive the light from the second light source reflected by the reflecting member; and
   a collecting member disposed to receive the light from the first member and the second member at a first end.

10. The avionic display of claim 9, wherein the collecting member is a tapered rod.

11. The avionic display of claim 10, wherein to tapered rod has a larger width at a first end farther from the first and second members than at a second end closer to the first and second members.

12. The avionic display of claim 11, wherein the tapered rod has the same height at the first end and the second end.

13. A light apparatus, comprising:
   means for reflecting first light from a first light source and second light from a second light source, the means for reflecting including a first surface and a second surface, the first surface and the second surface being part of a same structure;
   means for providing the fist light along a fist path and the second light along a second path; and
   means for receiving the first light from the first path and the second light from the second path and providing the first light and the second light at a lift output.

14. The light apparatus of claim 13, wherein the light output is disposed to provide the first light and the second light to a display.

15. The light apparatus of claim 14, wherein the light output has uniform brightness.

16. A method of manufacturing a display having a prescribed field of view, the method comprising:
   providing a plurality of light sources;
   providing a reflective mirror having respective surfaces disposed to reflect light from respective light sources of the light sources;
   providing a plurality of respective light paths disposed to receive the light from the respective surfaces; and
   providing an integrating member disposed to receive the light from the light paths.

17. The method of claim 16, wherein the light paths are adhered to the integrating member.

18. The method of claim 16, wherein the light sources are provided through an aperture in a concave reflective member.

19. A lighting system, comprising:
   a single unit reflecting member having at least a first reflecting face and a second reflecting face, the first reflecting face receiving light from the first lamp and the second reflecting face receiving light from the second lamp;
   a first lamp;
   a second lamp; and
   an optical coupler including a first rod, a second rod and a tapered rod, the first rod receiving light from the first lamp, the second rod receiving light from the second lamp, wherein the tapered rod is coupled to the first rod and the second rod at a first end face, the tapered rod providing light at an output at a second end face opposite the first end face, the first reflecting face providing the light from the first lamp to the rod, the second reflecting face providing the light from the second face to the second rod.

20. A lighting system, comprising:
   a first lamp;
   a second lamp; and
   an optical coupler including a first rod, a second rod and a tapered rod, the first rod receiving light from the first lamp, the second rod receiving light from the second lamp, wherein the tapered rod is coupled to the first rod and the second at a first face, the tapered rod providing light at an output at a second face opposite the first face;
   a third lamp;
   a fourth lamp;
   a third rod;
   a fourth rod; and
   a reflecting mirror having a first reflecting surface, a second reflective surface, a third reflective surface, and a fourth reflective surface; the first second, third and fourth reflecting surfaces receiving light from the first, second, third, and fourth lamps, respectively, and providing light to the first, second, third, and fourth rods, respectively, wherein the tapered rod is coupled to the third rod and the fourth rod at the first face.

21. A method of operating a light system, the method comprising:
   providing first light through a first coupling member to an integrating member;
   providing second light through a second coupling member to the integrating member;
   providing third light through a third coupling member to the integrating member;
   providing fourth light through a fourth coupling member to the integrating member, wherein the first, second, third, and fourth coupling members are arranged in an at least 2×2 matrix.

22. The method of claim 21, wherein the first light and the second light are simultaneously provided.

23. The method of claim 21, wherein the second light is provided after the first light is provided.

24. The method of claim 21, wherein the first light and the second light a simultaneously provided in response to a control signal to provide increased brightness.

25. The method of claim 21 wherein the 2×2 matrix is bounded by a perimeter of the coupling member at a first end of the coupling member.

26. An apparatus, comprising:
   a reflecting member disposed between two or mote light sources, the reflecting member having a first area for the first source and a second area for the second source;
   a first coupling member disposed to receive light reflected from the firs area to receive light reflected
   a second coupling member disposed to receive light reflected from the second area; and
   an integrating member disposed to receive light from the second coupling member.

27. The apparatus of claim 26, wherein the coupling members are fiber optics.

28. The apparatus of claim 26, wherein the reflective member is a conically shaped mirror.

* * * * *